No. 833,472. PATENTED OCT. 16, 1906.
H. MEHNER.
PROCESS OF OBTAINING METALS AND COMPOUNDS THEREOF.
APPLICATION FILED FEB. 18, 1904.
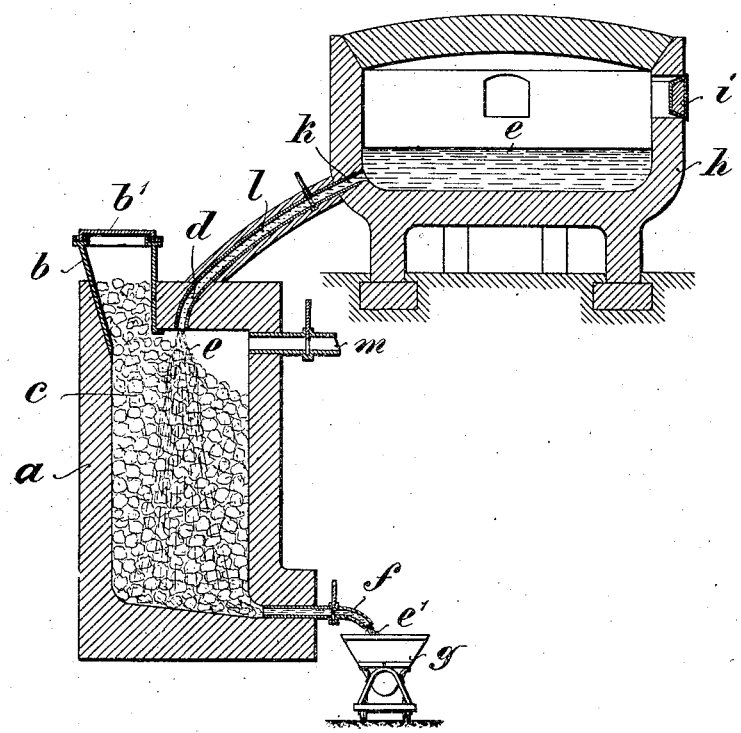
WITNESSES:
A. L. O'Brien
Charles Pillow
INVENTOR:
HERMANN MEHNER
by Dickerson, Brown, Raegener & Binney
att'ys

UNITED STATES PATENT OFFICE.

HERMANN MEHNER, OF BERLIN, GERMANY.

PROCESS OF OBTAINING METALS AND COMPOUNDS THEREOF.

No. 833,472.     Specification of Letters Patent.     Patented Oct. 16, ...

Application filed February 18, 1904. Serial No. 194,279.

*To all whom it may concern:*

Be it known that I, HERMANN MEHNER, doctor of philosophy, a subject of the King of Saxony, whose post-office address is No. 1 Königgrätzerstrasse, Berlin, Prussia, German Empire, have invented a new and useful Process of Obtaining Metals and Compounds Thereof; and I do hereby declare that the following is a full, clear, and exact description of my invention, which will enable others skilled in the art to which it appertains to make and use the same.

This invention relates to the process of extracting metals from ores and other compounds by means of the combined action of heat and reducing agents; and it has for its object to so improve this process that the extraction of such metals as then are set free in the state of vapors—as, for instance, zinc, sodium, potassium, and others well known to chemists—and the dry hot production of compounds thereof will be largely deprived of the thermical inconveniences connected with the usual method of supplying the heat, as well as from other disadvantages connected therewith. Taking the extraction of zinc after the usual distillation process as an example, this process is carried out in retorts, and the heat is supplied through the walls of the latter. It is well known to those skilled in the art that this supply of heat cannot be effected but with great losses, that those losses gave to metallurgists the idea of carrying out the process in shaft-furnaces, and that the attempts to do this have failed because of the incapability of the known heating methods to supply the furnace with the large amount of heat at all or at a tolerable cost. Now I have found that those difficulties can be overcome with ease and great advantage by bringing the ores or compounds while under the action of the reducing agent in contact with an incandescent fluid heat-carrier incapable of absorbing or otherwise injuring the metallic vapors—for instance, such as molten silicates (including slag, scoria, cinder, and the like) or a molten metal, as iron—the heat-carrier being heated above its melting-point up to incandescence.

Starting, for instance, from the decomposition of zinc oxid by means of carbon, which takes place according to the equation $$ZnO + C = CO + Zn,$$

and admitting the cold state, then the thermic equation will be

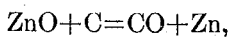

that is to say, to produce sixty-five kilograms of zinc ninety thousand calories are required.

Now considering that one cubic meter of silicate—for instance, an alkaline silicate having a specific heat of 0.3 and a specific weight of 3.0—is capable of transmitting nine hundred calories for each degree centigrade by which it is cooled or ninety thousand calories by causing it to cool by 100° centigrade—that is, the amount of heat required for producing sixty-five kilograms of zinc—it is readily understood how much the process is improved as regards utilization of heat. In applying instead of silicates molten and highly-heated iron the thermic effect will be still greater, and, moreover, the use of iron is attended with another important advantage in working sulfur-containing ores, as will be pointed out later on. The essence of my present invention therefore consists in a broad sense in bringing in contact with each other the compound or compounds whereof the metal is to be extracted, the reducing agent, and an incandescent fluid heat-carrier of such a nature as not to absorb or otherwise do harm to the metallic vapors generated.

The heat-carrier will preferably consist of a molten silicate (including slag, scoria, cinders, and the like) heated above its melting-point up to incandescence or a molten metal heated above its melting-point up to incandescence, especially iron; but any other serviceable substance may be used, and therefore I do not limit myself to the use of silicates and metals. If silicates are used, the melting-point thereof can easily be regulated by the addition of alkalies.

The improved process may be carried out in several ways, and I proceed to describe some of them, taking zinc as the metal to be extracted from zinc ore, which may be galmey, zinc-blende, zinc-glance, or any other zinc ore, including the so-called "composite ores."

The process may be carried out by charging an ordinary shaft-furnace with a mixture of zinc ore and an excess of carbon (coal, coke, bitumen, asphalt, pitch, and the like) and causing a current of a molten silicate heated up to incandescence, preferably to a bright cherry-red at least, to percolate through the said mixture. I, however, prefer to charge the furnace with carbon alone and to add the zinc ore to the molten slag or other incandescent fluid, thus using the same as a combined heat and ore carrier. Moreover, I prefer to so direct the inflowing current as to cause the same to take its path through the central or core portion of the contents of the furnace.

The mixture of zinc-vapors generated and carbon monoxid resulting from the carbon absorbed by the reducing process are caused to escape from the upper portion of the furnace into a condenser to be separated.

The zinc-vapors are obtained in as dense a state as in the usual distillation process, being only attenuated by such a quantity of carbon monoxid as corresponds to the equation

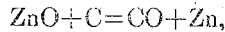

$$ZnO + C = CO + Zn,$$

and consequently no more carbon is consumed than is required by theory. On the other hand, the great losses of zinc, which in the usual distillation process are caused by the permeable condition of the walls of the retorts, of which a large number is needed, can easily be avoided by lining the furnace with bricks of dense carbon, which do not absorb zinc-vapors or allow the vapors to penetrate them. Moreover, they are not attacked chemically, owing to the reducing atmosphere which is existing in the furnace, and do not react with the current of silicate, which for the most part of its path passes at a distance from the walls.

The silicate escaping from the lower part of the furnace is collected, heated anew to a bright cherry-red at least, mixed with a fresh quantity of ore, corresponding to that composed in the preceding operation, and then returned to the upper portion of the furnace. From this it is evident that such losses of zinc as are caused in the ordinary zinc-distillation process by incomplete reaction and entrance of zinc into the slag or other residues of the process are avoided, as any remainder of zinc ore, as well as any absorbed zinc, are returned to the furnace.

The heating of the silicate may be carried out in a cupola-furnace, preferably such as is used for making slag for the production of slag-wool, and then the fuel should be as free as possible from mineral substances, so as not to contaminate the silicate, or the heating of the silicate may be effected by means of producer-gas in apparatus similar to a converter, or any other suitable heating method may be made use of.

On the annexed sheet I have illustrated in a mere schematical manner a combination of apparatus suitable for carrying out my improved process, the decomposing-furnace, the reheating-furnace, and their connection being shown in cross-section.

$a$ is the decomposing-furnace, being a shaft-furnace provided on top with a hopper $b$ for supplying it with coke or a mixture of coke and zinc ore $c$ and with a centrally-located inlet $d$ for the incandescent slag $e$, the hopper $b$ being closed by a sealed lid $b'$. At one side of the bottom, which is slightly inclined, the shaft-furnace has an outlet $f$ for the used slag $e'$, which is received by a transportable vessel—for instance, a truck or cinder-tub $g$.

$h$ is the reheating-furnace, preferably a reverberatory furnace of well-known type having a door $i$, through which it is supplied with the used slag to be reheated, and a tap-hole $k$ for discharging the reheated slag into the shaft-furnace $a$, the slag-inlet $d$ of the latter being connected with said tap-hole through a pipe $l$. Near its top the shaft-furnace $a$ is provided with an outlet $m$ for the metallic vapors generated therein, the condenser for said vapors and its connection with the outlet $m$ being omitted from the drawing.

In case the ore contains besides zinc other metals—such as lead, silver, copper, and others, as frequently occurs—or is a so-called composite ore then those metals will collect on the bottom of the furnace below the silicate, and the mixture may be tapped off through a tap-hole at suitable intervals and separated into its constituents by the aid of well-known methods.

The return of the reheated silicate to the furnace will not be attended with a sensible cost, as will readily be seen from the following consideration: Supposing the distance between the outlet and the inlet for the silicate to be six meters and one cubic meter of the silicate having the specific weight 3.0 to weigh three thousand kilograms to be used for producing sixty-five kilograms zinc in one hour, then to lift those three thousand kilograms there are required eighteen thousand meter kilograms per hour or $18,000 \div 3,600 = 5$ meter kilograms per second—that is to say, $5 \div 75 = 1 \div 15 = 0.066$ H. P. Moreover, there is a large economy in comparison with the usual zinc-distillation process as concerns wages for workmen and material for construction and renewal of the vessels. This is a very important advantage, as thereby my invention is enabled to be practiced in uncultivated districts and with comparatively poor zinc ores.

The molten slag, scoria, cinder, or other silicate may in either case be replaced by a molten metal heated above its melting-point up to incandescence. As such I prefer to use iron, as this metal is by itself a reducing agent for zinc ores, especially zinc-blende and zinc-glance. In case of sulfur-containing zinc ores I prefer to charge a shaft-furnace with a mixture of coal and zinc ore or with zinc ore alone and to cause a current of molten iron heated to at least a bright cherry-red to percolate through the mixture. The iron by its contact with the ore drives out the zinc in the state of vapors and combines with the sulfur contained in the ore. The mixture of zinc vapors and gases or the zinc-vapors alone are caused to pass into a separator. The molten iron escaping from the lower portion of the furnace is collected and reheated by means of the absorbed sulfur, this being effected by blowing a current of air through the iron, whereby the sulfur is burned to sulfur dioxid, which leaves the iron in the gaseous state, and may be collected for use. The reheated iron is then returned to the furnace.

As will readily be understood by those skilled in the art, my present invention may be used for driving out any distillable metals from compounds. Such metals are, for instance, sodium, potassium, quicksilver, cadmium, and arsenic, and, moreover, there is no doubt that metals of a higher vaporization-point than those can with advantage be distilled from compounds and ores by means of my improved process, and the molten and highly-heated metallic heat-carrier may also be used for at once absorbing the metallic vapors—for instance, to form alloys.

I have already in a general sense referred to the use of my improved process for producing metallic compounds. This will be done by admitting to the furnace such gaseous reagents as are capable of at once combining with the metallic vapors generated. For instance, if it is desired to produce pure zinc sulfid from zinc ores for use as a paint sulfur is vaporized outside of the furnace, and the sulfur-vapors are led into the furnace at a suitable point, so as to mix and combine with the zinc-vapors generated to form zinc sulfid, which is collected in a suitable separator, and thereby obtained in the form of an impalpable powder. Instead of with sulfur-vapors the furnace may be supplied with suitable gaseous sulfur compounds—such as sulfured hydrogen, sulfid of ammonium, and the like. If desired, the sulfur-vapors may be generated within the furnace by supplying the same with sulfur. If it is desired to obtain pure zinc-white in a finely-flocculent condition, oxygen or air or carbonic acid and the like is admitted to the escaping zinc-vapors, so as to burn them. In a like manner gaseous compounds of metals may be obtained—such for instance, as sodium hydrogen—which is a very valuable material for filling aerostats. In this instance my improved process is used for generating sodium-vapors from sodium oxid or carbonate, and during the generation of such vapors pure hydrogen is admitted, which combines with the sodium-vapors into sodium hydrogen, or instead of pure hydrogen water-gas may be used.

I wish it to be understood that the term "metal" as used in the annexed claims is intended to comprise any metal capable of being volatilized by my process, that the term "incandescent fluid heat-carrier" is intended to include any fluid obtained by melting and heating the same above their melting-point up to incandescence suitable solid substances, and that the term "zinc ore" is intended to include any natural and artificial zinc compound, zinc-containing residues, tailings, and the like, treated either separately or mixed with each other or with other compounds.

What I claim, and desire to secure by Letters Patent of the United States of America, is—

1. The described process which consists in bringing in contact with each other a compound or compounds of a metal or metals, an agent capable of generating metallic vapors from said compound or compounds, and an incandescent fluid heat-carrier, and leading off the vapors and gases for separation, substantially as described.

2. The described process which consists in bringing in contact with each other a compound or compounds of a metal or metals, an agent capable of generating metallic vapors from said compound or compounds, and an incandescent fluid heat-carrier, admitting a gaseous agent to cause metallic compounds to be formed from the metallic vapors generated, and leading off the mixture of vapors and gases for separation, substantially as described.

3. The described process which consists in bringing in contact with each other a compound or compounds of a metal or metals and an incandescent fluid capable of generating metallic vapors from said compound or compounds, leading off the vapors and gases for separation, supplying the said fluid with heat and using it for decomposing a fresh quantity of said compound or compounds, substantially as described.

4. The described process which consists in bringing in contact with each other a compound or compounds of a metal or metals and an incandescent fluid capable of generating metallic vapors from said compound or compounds and of absorbing the sulfur contained therein, leading off the vapors and gases for separation, blowing air through the said fluid to heat it by the combustion of the sulfur absorbed and using it for decomposing a fresh quantity of compound or compounds, substantially as described.

5. The described process which consists in bringing zinc ore in contact with carbon and an incandescent fluid heat-carrier, leading off the zinc vapors and gases generated for condensation and separation, substantially as described.

6. The described process which consists in bringing zinc ore in contact with carbon and a molten silicate heated up to incandescence, and leading off the zinc vapors and gases generated for separation, substantially as described.

7. The described process which consists in bringing zinc ore in contact with carbon and a molten silicate heated up to incandescence, admitting a gas for converting the zinc-vapors generated into vapors of a zinc compound, leading off the vapors and gases generated for separation, substantially as described.

8. The described process which consists in bringing zinc ore in contact with carbon and a molten silicate heated up to incandescence, admitting air to convert the zinc-vapors into vapors of zinc oxid, and leading off the mixture of zinc-oxid vapors and gases for separation, substantially as described.

9. The described process which consists in adding zinc ore to a molten silicate heated up to incandescence, causing the mixture to pass through an excess of carbon, and leading off the mixture of zinc vapors and gases for separation, substantially as described.

10. The described process which consists in adding zinc ore to a molten silicate heated up to incandescence, causing the mixture to pass through an excess of carbon, leading off the zinc vapors and gases for separation, collecting the outflowing silicate, supplying it with a fresh quantity of zinc ore and with heat, and again bringing the mixture to contact with an excess of carbon, substantially as described.

11. The described process which consists in adding zinc ore to a molten silicate heated up to incandescence, causing the mixture to pass through an excess of carbon, admitting air for converting the zinc-vapors generated into vapors of zinc oxid, leading off the mixture of zinc-oxid vapors and gases for separation, collecting the outflowing silicate, supplying it with a fresh quantity of zinc ore and with heat, and again bringing the mixture in contact with carbon, substantially as described.

In testimony whereof I have hereunto set my hand in presence of two subscribing witnesses.

HERMANN MEHNER.

Witnesses:
   HENRY HASPER,
   WOLDEMAR HAUPT.